United States Patent [19]
Hopwood

[11] Patent Number: 5,240,063
[45] Date of Patent: Aug. 31, 1993

[54] CASTING APPARATUS FOR CONNECTING A BATTERY PLATE TO A METAL STRAP

[76] Inventor: Robert T. Hopwood, 34 Alma Road, Hatherley, Cheltenham, Gloucestershire, GL51 5LZ, United Kingdom

[21] Appl. No.: 847,036

[22] PCT Filed: Oct. 16, 1990

[86] PCT No.: PCT/GB90/01593
§ 371 Date: Apr. 16, 1992
§ 102(e) Date: Apr. 16, 1992

[87] PCT Pub. No.: WO91/05625
PCT Pub. Date: May 2, 1991

[30] Foreign Application Priority Data
Oct. 20, 1989 [GB] United Kingdom ............... 8923690

[51] Int. Cl.⁵ .................... B22D 23/04; B22D 25/04; B22D 39/00
[52] U.S. Cl. .................... 164/337; 164/133; 164/DIG. 1
[58] Field of Search ............ 164/337, 133, DIG. 1

[56] References Cited
U.S. PATENT DOCUMENTS

| 3,565,162 | 2/1971 | Farmer | 164/337 |
| 3,802,488 | 4/1974 | Hull et al. | 164/DIG. 1 X |
| 3,815,659 | 6/1974 | Pavlo et al. | 164/337 X |
| 4,053,012 | 10/1977 | Farmer | |
| 4,083,478 | 4/1978 | McLane | 164/337 X |
| 4,108,417 | 8/1978 | Simonton et al. | 164/133 X |
| 4,180,120 | 12/1979 | Eberle | |
| 4,289,193 | 9/1981 | Stamp | 164/DIG. 1 X |

FOREIGN PATENT DOCUMENTS

| 0221331 | 5/1987 | European Pat. Off. | |
| 58-19859 | 2/1983 | Japan | 164/DIG. 1 |

Primary Examiner—J. Reed Batten, Jr.
Attorney, Agent, or Firm—Young & Thompson

[57] ABSTRACT

Casting apparatus 10 includes a lead pot 11, a pump unit 12 and a mould block 13, having feed duct 14. The feed duct 14 communicates with the pump unit 12 by means of a supply passage 17, which is also connected to an overflow outlet 18, which can be closed by a dump valve 19. In normal operation the level of the lead in the feed duct is kept to a datum level 23 defined by the overflow. During 'pouring' however the dump valve 19 is closed.

7 Claims, 1 Drawing Sheet

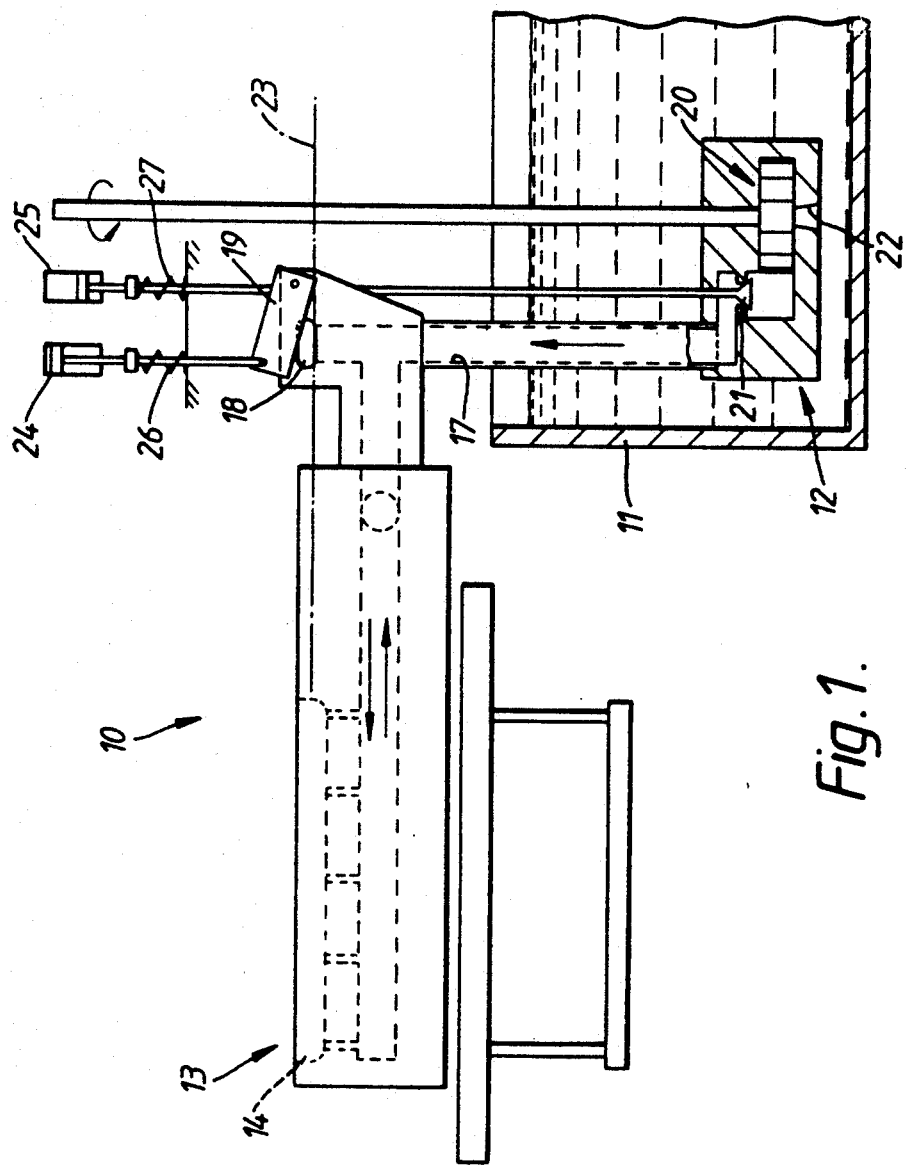
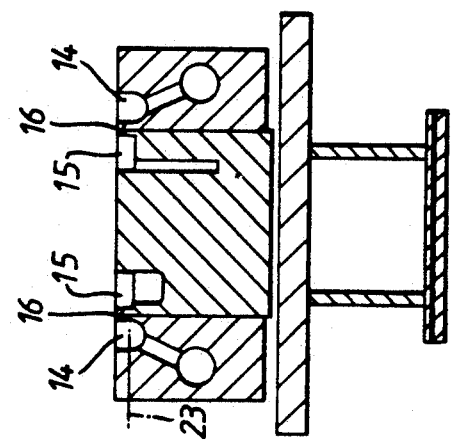
Fig. 1.
Fig. 2.

CASTING APPARATUS FOR CONNECTING A BATTERY PLATE TO A METAL STRAP

BACKGROUND OF THE INVENTION

This invention relates to casting apparatus of the type for connecting a battery plate to a metal strap or post.

Such apparatus was described in British Patent No. 2,023,471B. In this arrangement a pump 13 delivers a metered shot of lead through an inlet valve 203 into a feed duct 52 causing lead to overflow into mould cavities 51. A dump valve 82 is then opened and the lead in the feed duct 52 falls back to a datum or constant head level defined by the level of the dump valve. Whilst this was a considerable improvement over existing casting arrangements certain problems have been experienced. First the inlet valve has a tendency to become clogged so that it does not seat properly. This results in the feed duct draining down into the lead pot and as a result the next "shot" of lead delivered by the pump results in insufficient filling of the cavities. Further the shockwave resulting from the delivery of the metered shot of lead causes ripples in the feed duct and hence incomplete filling of the cavities.

SUMMARY OF THE INVENTION

The present invention consists in apparatus for connecting a battery plate to a metal strap or post, including a mould having at least one strap or post cavity and a molten-metal feed duct adjacent thereto, a weir between the feed duct and the cavity, means for delivering molten-metal to one end of the feed duct including a pump for substantially continuous operation and a dump valve for allowing metal to flow out of the duct to a predetermined datum level when open and for causing metal to flow through -the weirs into the cavity, when closed.

By running the pump substantially continuously or completely continuously the shockwaves can be removed. In this constant running arrangement the overflowing of the lead from the feed duct into the cavities can be achieved in a number of ways. First the pump can be run at a single speed and overflow is achieved simply by closing the dump valve. This leads to a rather high circulation of lead and hence oxide formation. Secondly the pump may be run at at least two speeds; a first low speed which is designed simply to prevent the feed duct leaking down into the pot and a second high speed which will deliver an appropriate amount of lead into the feed duct for the cavities to be filled By timing the period of the second high speed and the operation of the dump valve the lead could be metered quite precisely. Thirdly the apparatus may include an inlet valve between the pump and the feed duct. In this case if the inlet valve becomes clogged then the pump will prevent any leakage from the feed duct into the pot, whilst the open dump valve will prevent the feed duct overflowing. Fourthly, and indeed preferably the pump may be switched off for a very short period of time after the lead has flowed into the cavities, in order to increase the effective head acting on the lead in the duct and hence the rate at which the predetermined datum level is achieved.

In a preferred embodiment the pump is an impeller pump and means are provided for closing the dump valve only when the cavities are to be filled. The means for closing the dump valve may operate in response or in timed relationship with the opening and closing of the inlet valve. Alternatively in the situation where there is no inlet valve the means for closing the dump valve may operate in relation to the pump speed or some other cyclic element in the casting apparatus.

BRIEF DESCRIPTION OF THE DRAWINGS

The invention may be performed in various ways and specific embodiments will now be described, by way of example, with reference to the accompanying drawings, in which:

FIG. 1 is a diagrammatic side view of a casting apparatus;

FIG. 2 is a sectional view through the mould block of FIG. 1; and

FIG. 3 illustrates an alternative form of dump valve.

DETAILED DESCRIPTION OF THE INVENTION

The apparatus generally indicated at 10 comprises a lead pot 11, a pump unit 12 and a mould block 13.

The mould block 13 is essentially identical to that described in the previous Application but briefly it comprises a feed duct, 14 separated from mould cavities 15 by weirs 16. The feed duct communicates with the pump unit 12 by means of a supply passage 17, which is also connected to an overflow outlet 18, which can be closed by a dump valve 19.

The pump unit includes an impeller pump 20 and an inlet valve 21. The impeller pump 20 draws lead in from the lead pot 11 through an inlet 22 and, when the inlet valve 21 is open, feeds lead up into the supply passage 17 and hence into the feed duct 14.

In normal operation the level of lead in the feed duct 14 is kept to a datum level 23 defined by the overflow outlet 18. When lead is to be poured into the mould cavities 15, the dump valve 19 closes the overflow outlet 18 and the inlet valve 21 is opened allowing a sustained flow of lead into the feed duct 14 so that the lead overflows the weirs 16. The dump valve 19 is then opened and the inlet valve 21 closed (and the pump may be momentarily switched off) so that the lead in the feed duct falls back below the height of the weir 16 once sufficient lead has been poured into the cavities 15.

If, however, the inlet valve 21 becomes clogged so that it no longer seats properly any downwardly leakage from the supply passage is prevented by the flow of lead through the resultant gap up into the passage 17. If the rate of flow is such that excessive lead is received in the feed duct 14 then this will be regulated by the open overflow outlet 18 which maintains the datum level. This method of operation saves a considerable downtime in the apparatus, because currently pumps are having to be stripped out once a week.

As has been mentioned above the alternative operations can be achieved in an arrangement omitting the inlet valve 21. Both valves are operated by hydraulic rams 24, 25 against springs 26, 27. The dump valve is preferably arranged to fail open.

In the drawings the dump valve is shown as a flap pivoted about an axis extending generally parallel to the direction of flow through the valve. Alternatively it may be pivoted about a transverse axis, so it closes against the flow rather than 'slicing' across it. This means it is less likely to become jammed by any clog build up. A further possibility is shown in FIG. 3 in this case the dump valve 19 comprises a needle valve element 30 which locates in an 'open well' outlet 31 at the head of supply passage 17. The advantage of this arrangement is that it reduces the surface area of the lead which is exposed to the air and hence oxidisation and clogging.

I claim:

1. Apparatus for connecting a battery plate to a metal strap or post, including a mould having at least one strap or post cavity and a molten-metal feed duct adjacent thereto, a weir between the feed duct and said at least one cavity, means for delivering molten-metal to one end of the feed duct including a pump for substantially continuous operation and a dump valve for allowing metal to flow out of the duct to a predetermined datum level when open and for causing metal to flow over said weir into said at least one cavity, when closed.

2. Apparatus as claimed in claim 1, wherein there is an inlet valve between the pump and the feed duct.

3. Apparatus as claimed in claim 1 wherein the pump is an impeller pump.

4. Apparatus as claimed in claim 2 further including means for closing the dump valve only when said at least one cavity is to be filled.

5. Apparatus as claimed in claim 4, wherein the means for closing the dump valve operates in response or in timed relationship with the opening of the inlet valve.

6. Apparatus as claimed in claim 1, including means for driving the pump at more than one speed.

7. Apparatus as claimed in claim 6, further including means for closing the dump valve when the pump is accelerated.

* * * * *